Nov. 6, 1934.　　　E. L. JOHNSON ET AL　　　1,979,942
FLASHLIGHT OPERATING DEVICE
Filed Dec. 15, 1932
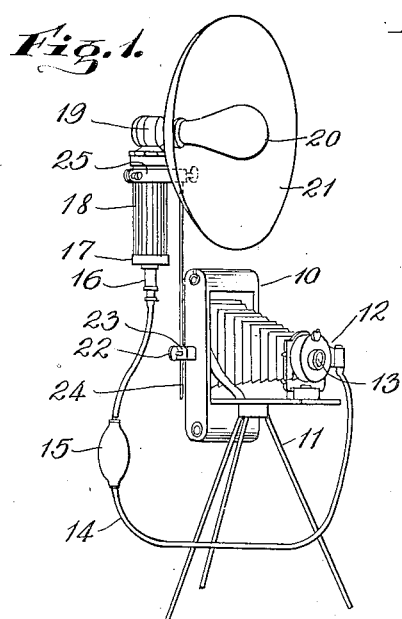
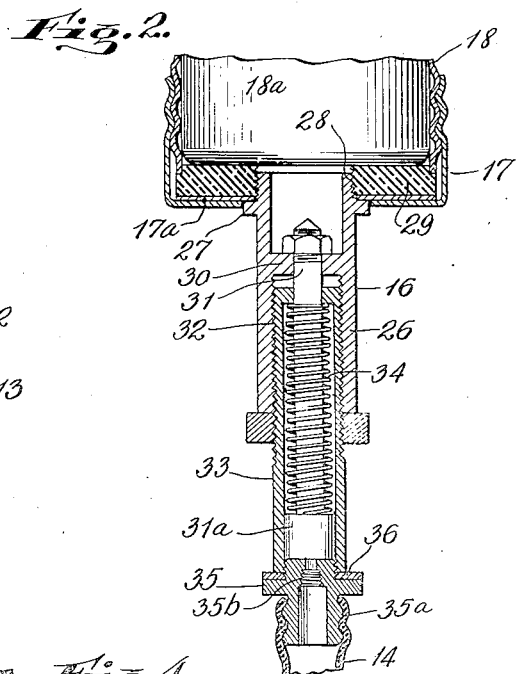
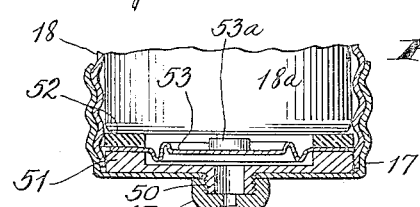
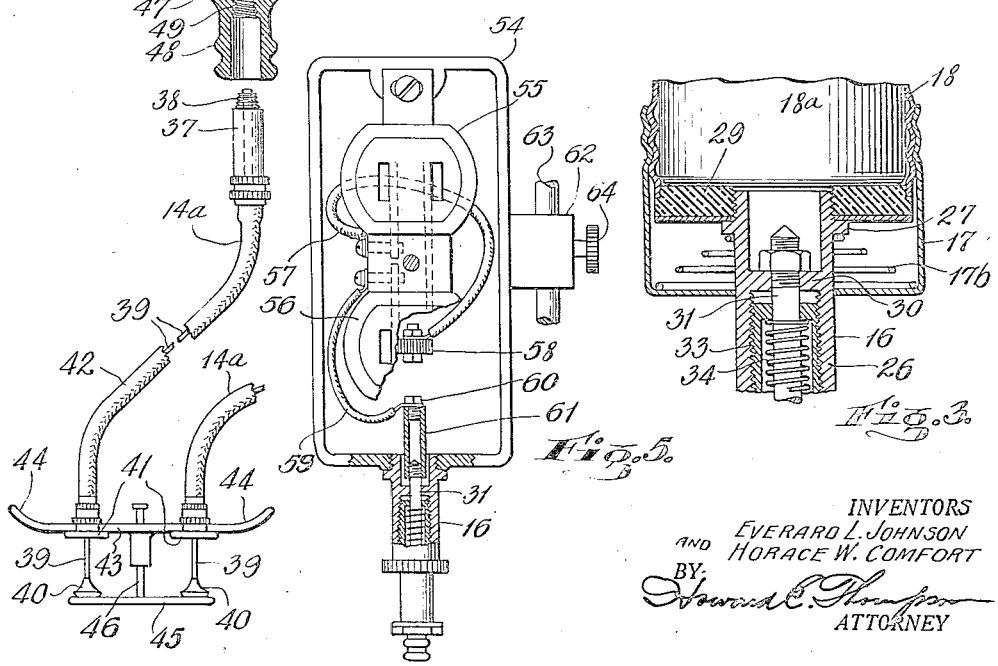
INVENTORS
EVERARD L. JOHNSON
AND HORACE W. COMFORT
BY
ATTORNEY Patented Nov. 6, 1934

1,979,942

UNITED STATES PATENT OFFICE 1,979,942

FLASH LIGHT OPERATING DEVICE

Everard Leroy Johnson, Patchogue, and Horace Willard Comfort, Blue Point, N. Y.

Application December 15, 1932, Serial No. 647,366

14 Claims. (Cl. 67—29)

This invention relates to devices for operating flashlights and to the provision of means for synchronizing the flash and shutter operation to improve the taking of flashlight pictures; and the object of the invention is to provide a control and operating device of simple construction and yet positive operation which may be used in connection with batteries or in conjunction with a house current supply, the device acting as a switch to complete the electric battery or other circuit to ignite an electric flash bulb; a further object being to provide means whereby the actuation of said switch will be synchronized with the actuation of the shutter of a camera; a further object being to provide a switch device of the class described in the form of a plug and including means actuated by a plunger or by compressed air for completing the electric circuit or for actuating a switching element; a further object being to provide a plug of the class described having means whereby a compressed air tube may be coupled therewith or a plunger actuating rod attached to the plug to provide the dual uses of the device; a further object being to provide a switching plug or device of the class described involving a plunger, a spring for normally supporting the switching element of the plunger in inoperative position and with means for adjusting the tension of the spring to synchronize the pressure required to actuate the same with that required to actuate the shutter of the camera; a further object being to provide a bracket structure for adjustably supporting the flashing unit in connection with a camera; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of our improvement are designated by suitable reference characters and in which:

Fig. 1 is a perspective view of a camera showing one of our improved synchronized flash controls mounted in connection therewith.

Fig. 2 is an enlarged, sectional detail view of a part of the construction shown in Fig. 1.

Fig. 3 is a view similar to Fig. 2 showing only a part of the constructiton and showing a modified assemblage.

Fig. 4 is a view similar to Fig. 2, of a modified form of device; and,

Fig. 5 is a plan view partly in section of a device applied to an electric plug box.

To illustrate one method of carrying the invention into effect, we have diagrammatically shown in Fig. 1 of the drawing, one of our improved devices in conjunction with a camera. In said figure, 10 represents a folding camera of conventional form supported upon a tripod 11, and at 12 is the shutter operating mechanism for controlling the operation of the camera shutter at 13, and which in the construction shown is operated by an air tube 14 coupled with the control 12. The tube 14 has a bulb 15 which also supplies compressed air to a switch or flashlight operating device 16.

The device 16 as illustrated in Fig. 1 of the drawing is coupled with the cap 17 of a battery container 18 in the form of a conventional or substantially conventional flashlight device, modified slightly in that an electric bulb socket 19 is substituted for the usual reflector head containing the electric bulb. With the socket 19 is adapted to be coupled a flash bulb 20 and a reflector disk 21.

We also employ a bracket for adjustably and detachably coupling the flash unit in connection with the camera 10. This bracket structure consists of an apertured plug 22 coupled with one of the threaded sockets of the camera with which the tripod screw is usually coupled, the plug 22 having a set screw 23 for engaging a rod 24 slidably mounted in the plug. The rod 24 extends above the camera and has at its upper end a clamp ring 25 encircling the battery casing 18.

The switch or control device 16 is shown in detail in Fig. 2 of the drawing, and also the manner of connecting the same with the cap 17. This device consists of a tubular body 26 having a flange 27 at its upper end and being threaded as seen at 28 to engage the threaded bore of a disk 29 of insulating material.

In the construction shown, it will be understood that the battery is insulated from the casing 18 in the usual manner, and the flange 27 engages a washer or ring 17a against which the cap 17 rests so as to complete an electric ground connection between the casing 18 and the tube 16. In the bore of the tube 16 is a transverse wall 30 in which is slidably mounted a plunger rod 31, the upper end of which is adapted to make contact with the lower surface of a battery 18a supported in the casing 18 and normally in spaced relation with the upper end of the tube 16. The bore of the tube 16 below the partition wall 30 is internally threaded as seen at 32 to receive a supplemental tube 33 which is in threaded engagement therewith to provide longitudinal adjustment of the tube 33 in the tube 16 and control the tension of a spring 34 which seats in the inner end of the tube 33 and upon the lower piston end 31a of the rod 31.

Attached to the lower end of the supplemental tube 32 is a nipple or coupling 35, the connection being sealed by a gasket or packing 36, and the outer end of this nipple is beaded as seen at 35a to receive the flexible air tube 14, whereas the inner end of the bore of said nipple is reduced and threaded as seen at 35b to permit the coupling of a conventional shutter operating device such as indicated at 14a in Fig. 4 of the drawing with the coupling 35. This device has at one end a tubular coupling 37 with a threaded part 38 for engaging the threads 35b.

This device includes a plunger rod 39 advanced by a finger piece 40 protruding through the end 41 of the flexible tube 42 of said device as seen in Fig. 4 of the drawing. These devices are commonly used in photography and are coupled with the camera shutter control for operating a shutter. In other words, instead of operating the piston 31a to move the rod 31 upwardly into engagement with the lower surface of the battery 18a, the rod 39 of the device shown in Fig. 4 when coupled with the nipple 35, instead of the tube 14, will accomplish the same result, it being understood that either type of operating means may be employed. At this time, it will also appear from a consideration of Fig. 4 of the drawing that another device 14a similar in all respects to the first named device will be coupled with the shutter of the camera or the control thereof, and both of the buttons or plungers 40 and the adjacent ends 41 of the tubes 42 are united in a unit control or operating device 43 consisting of a cross bar having split or yoke-shaped ends 44 for receiving the enlargements 41, and a cross arm or finger piece 45 engaging the button ends 40 of the rods 39 and slidably engaging the cross bar 40 through a central shaft 46 so that a single depression of the arm 45 will operate in unison both of the rods 39 to synchronize the operation of the flash bulb 20 with that of the operation of the shutter 13.

In Fig. 3 of the drawing, we have shown a slight modication of the construction shown in Figs. 1 and 2, wherein the device 16 is of the same construction as that shown in Fig. 2 but is mounted in connection with the holder, namely the casing 18 and cap 17 in a different manner. That is to say, the cap 17 is slightly longer than the cap shown in Fig. 2, and a spiral spring 17b is disposed between the flange 27 of the tube 26 and the bottom of the cap 17 so that the disk of insulating material 29 is tensionally supported in engagement with the battery 18a by the spring 17b. Aside from the method of mounting above referred to, the structure shown in Fig. 3 will operate in the same manner as that shown in Fig. 2.

In Fig. 4 of the drawing, we have shown a simplified form of switch operating or circuit closing device, which eliminates the use of the rod 31, piston 31a, as well as the supplemental tube 33 and other parts. With this construction, a device 47 substantially similar to the nipple 35 is employed having a beaded end 48 for receiving a flexible tube 14 and an internal reduced thread 49 for receiving the thread 38 of the device 14a, and the inner end is internally threaded to engage the threaded sleeve on a disk 51 between which and the end of the nipple 47, the closed end wall of the cap 17 is clamped.

Supported between the disk 51 or the enlarged periphery thereof and a washer of insulating material 52 is a flexible diaphragm 53 which forms a switch element for completing the circuit to the battery 18a supported in the casing 18, it being understood that the structure of the casing and cap is identical with that shown in Fig. 2. Centrally of the diaphragm, is a contact button 53a which is moved into engagement with the lower surface of the battery 18a, either by the rod 39 which flexes the diaphragm inwardly or upwardly as seen in Fig. 4 of the drawing, or this diaphragm may be flexed by air from the tube 14.

In Fig. 5 of the drawing, we have shown one of the control devices 16 mounted in connection with a plug socket casing 54 in which are supported two sockets 55 and 56. For the purpose of this description, the socket 56 will receive the plug from a source of electric house current supply, and the socket 55 will provide means for supporting a flash bulb such as the bulb 20 in connection therewith through a suitably formed electric coupling element having a plug end. One terminal of each socket 55, 56, is coupled together, whereas the other terminal of the socket 55 has a wire 57 extending to a contact 58, and the other terminal of the socket 56 has a wire 59 extending to and coupled with a screw contact 60 on the end of an insulating tube 61 which is coupled with and movable with the upper end of the switch rod 31 of the control device 16 so that as the rod 31 is moved upwardly, it carries with it the tube 61 and moves the contact screw 60 into engagement with the contact 58, thus completing the electric circuit from the source of supply to both terminals of the socket 55 to explode the flash bulb. The casing 54 is preferably provided with an apertured block or plug 62 in connection with which a rod 63 is adjustably mounted and retained by a set screw 64. The rod 63 is equivalent to the bracket rod 24, and the block 62 is substituted for the clamp 25 shown in Fig. 1. With this construction, the casing 54 may be supported in connection with and above the camera, although this mounting is not essential. At this time, it will also be understood that instead of connecting one bulb in connection with the socket 55, this socket may have connected with it a circuit consisting of circuit wires with a number of bulb sockets therein so as to ignite a plurality of flash bulbs in one operation.

It will be understood that our invention is not necessarily limited to the dual and synchronized operation of the shutter and flash as in some cases it may be desirable to provide independent controls, in which event a single flexible shaft or bulb and tube will be attached to the several devices to actuate the switching elements and in like manner to actuate the shutter or shutter control. However, it will appear that by virtue of our improved construction, the synchronized control which is desirable in most photography is accomplished in a very simple and effective manner, and by means of a device which is of economical construction, and as disclosed, the device may be utilized in conjunction with a storage battery supply of electric energy or with a house current or other electric supply.

It will be understood that while we have shown certain details of construction for carrying our invention into effect, we are not necessarily limited to these details and various changes in and modifications of the construction herein shown and described may be made within the scope of the appended claims without departing from the spirit of our invention or sacrificing its advantages.

Having fully described our invention, what we claim as new and desire to secure by Letters Patent, is:—

1. A circuit closing device of the class described comprising a tubular casing, a tube adjustably mounted in and in threaded engagement with the casing and projecting from one end thereof, a switch rod slidably mounted in the casing and tube, one end of the rod being enlarged to form a piston disposed in said tube, means at the other end of the rod for limiting movement thereof in one direction with respect to said casing, a spring seating in the inner end of the tube and upon said piston to normally support the rod in open circuit position, and means at the outer end of said tube for detachably coupling a switch rod operating element in connection therewith.

2. A circuit closing device of the class described comprising a tubular casing, a tube adjustably mounted in and in threaded engagement with the casing and projecting from one end thereof, a switch rod slidably mounted in the casing and tube, one end of the rod being enlarged to form a piston disposed in said tube, means at the other end of the rod for limiting movement thereof in one direction with respect to said casing, a spring seating in the inner end of the tube and upon said piston to normally support the rod in open circuit position, means at the outer end of said tube for detachably coupling a switch rod operating element in connection therewith, the other end of the casing including an enlarged cup-shaped cap for mounting the device in connection with a support and a disk of insulating material in said cap and projecting beyond the end of the casing to insulate the casing from one side of the circuit controlled by said device.

3. A circuit closing device of the class described comprising a tubular casing, a tube adjustably mounted in and in threaded engagement with the casing and projecting from one end thereof, a switch rod slidably mounted in the casing and tube, one end of the rod being enlarged to form a piston disposed in said tube, means at the other end of the rod for limiting movement thereof in one direction with respect to said casing, a spring seating in the inner end of the tube and upon said piston to normally support the rod in open circuit position, means at the outer end of said tube for detachably coupling a switch rod operating element in connection therewith, and said last named means including an internally threaded tubular coupling detachably mounted on the outer end of said tube.

4. A circuit closing device of the class described comprising a tubular casing, a tube adjustably mounted in and in threaded engagement with the casing and projecting from one end thereof, a switch rod slidably mounted in the casing and tube, one end of the rod being enlarged to form a piston disposed in said tube, means at the other end of the rod for limiting movement thereof in one direction with respect to said casing, a spring seating in the inner end of the tube and upon said piston to normally support the rod in open circuit position, means at the outer end of said tube for detachably coupling a switch rod operating element in connection therewith, the other end of the casing including an enlarged cup-shaped cap for mounting the device in connection with a support and a disk of insulating material in said cap and projecting beyond the end of the casing to insulate the casing from one side of the circuit controlled by said device, and a spring interposed between the cap and casing for tensionally holding the casing in connection with its support.

5. The combination with the tubular casing of a battery holder of the class described of a switch device for opening and closing the battery circuit, said device comprising a cap in threaded engagement with the casing, said switch device including relatively adjustable tubes projecting axially from one end of the battery casing, a plunger switch rod in said tubes, means for normally supporting the rod in open circuit position, and means detachable with respect to one of said tubes adapted to actuate said rod to move the same into closed circuit position.

6. The combination with the tubular casing of a battery holder of the class described, of a switch device for opening and closing the battery circuit, said device comprising a cap in threaded engagement with the casing, said switch device including relatively adjustable tubes projecting axially from one end of the battery casing, a plunger switch rod in said tubes, means for normally supporting the rod in open circuit position, means detachable with respect to one of said tubes adapted to actuate said rod to move the same into closed circuit position, and said last named means including a manually actuated flexible shaft.

7. A flashlight operating device of the class described comprising a tubular battery casing, means at one end of the casing for coupling a bulb therewith, a switch member detachably coupled with the other end of the casing and projecting therefrom, means for insulating said member from one side of the battery circuit, said member including a tube, another tube adjustable with respect to the first named tube, a plunger slidably mounted in the second named tube and normally supported in open circuit position, means for actuating said plunger to close the battery circuit to ignite a flash bulb supported in said first named means and the outer end of said second named tube having a tubular coupling threaded internally to facilitate attachment to said last named means.

8. A flashlight operating device of the class described comprising a tubular battery casing, means at one end of the casing for coupling a bulb therewith, a switch member detachably coupled with the other end of the casing and projecting therefrom, means for insulating said member from one side of the battery circuit, said member including a tube, another tube adjustable with respect to the first named tube, a plunger slidably mounted in the second named tube and normally supported in open circuit position, means for actuating said plunger to close the battery circuit to ignite a flash bulb supported in said first named means, the outer end of said second named tube having a tubular coupling threaded internally to facilitate attachment to said last named means, and a spring seating in the second named tube and cooperating with said plunger.

9. A flashlight operating device of the class described comprising a tubular battery casing, means at one end of the casing for coupling a bulb therewith, a switch member detachably coupled with the other end of the casing and projecting therefrom, means for insulating said member from one side of the battery circuit, said member including a tube, another tube adjustable with respect to the first named tube, a plunger slidably mounted in the second named tube and normally supported in open circuit position, means for actuating said plunger to close the battery circuit to ignite a flash bulb supported in said first named means, the outer end of said second named tube having a tubular coupling threaded internally to facilitate attachment to said last named means, a spring seating in the second named tube and cooperating with said plunger, and means adjustable on the plunger and cooperating with the first named tube for limiting the movement of the plunger in one direction with respect thereto.

10. A flashlight operating device of the class described comprising a tubular battery casing, means at one end of the casing for coupling a bulb therewith, a switch member detachably coupled with the other end of the casing and projecting therefrom, means for insulating said member from one side of the battery circuit, said member including a tube, another tube adjustable with respect to the first named tube, a plunger slidably mounted in the second named tube and normally supported in open circuit position, means for actuating said plunger to close the battery circuit to ignite a flash bulb supported in said first named means, the outer end of said second named tube having a tubular coupling threaded internally to facilitate attachment to said last named means, a spring seating in the second named tube and cooperating with said plunger, means adjustable on the plunger and cooperating with the first named tube for limiting the movement of the plunger in one direction with respect thereto, and the adjustment of the second named tube controlling the tension of said spring and said coupling having an external bead.

11. A flashlight operating device of the class described comprising a tubular battery casing, means at one end of the casing for coupling a bulb therewith, a switch member detachably coupled with the other end of the casing and projecting therefrom, means for insulating said member from one side of the battery circuit, said member including a tube, another tube adjustable with respect to the first named tube, a plunger slidably mounted in the second named tube and normally supported in open circuit position, means for actuating said plunger to close the battery circuit to ignite a flash bulb supported in said first named means, the outer end of said second named tube having a tubular coupling threaded internally to facilitate attachment to said last named means, means including a clamp on the battery casing, and a rod extending from said clamp parallel with respect to the casing for mounting the device in connection with a suitable support.

12. A circuit closing device for battery holders of the class described comprising a tubular body, a cap projecting at one end of said body by means of which said tubular body may be detachably coupled with one end of the battery holder to place the tubular body in circuit with one side of the battery circuit through said cap, a disk of insulating material within said cap, said disk projecting beyond said tubular body to insulate the same from the other side of the battery circuit, and a plunger switch mounted in said tubular body.

13. A circuit closing device for battery holders of the class described comprising a tubular body, a cap projecting at one end of said body by means of which said tubular body may be detachably coupled with one end of the battery holder to place the tubular body in circuit with one side of the battery circuit through said cap, a disk of insulating material within said cap, said disk projecting beyond said tubular body to insulate the same from the other side of the battery circuit, a tube adjustably supported in said body, a plunger switch mounted in said adjustable tube and a spring seating in said adjustable tube and on said plunger switch to normally support the latter in open circuit position.

14. A circuit closing device for battery holders of the class described comprising a tubular body, a cap projecting at one end of said body by means of which said tubular body may be detachably coupled with one end of the battery holder to place the tubular body in circuit with one side of the battery circuit through said cap, a disk of insulating material within said cap, said disk projecting beyond said tubular body to insulate the same from the other side of the battery circuit, a tube adjustably supported in said body, a plunger switch mounted in said adjustable tube, a spring seating in said adjustable tube and on said plunger switch to normally support the latter in open circuit position, said adjustable tube projecting beyond the end of said body, a coupling at the free end of said tube, and means on said coupling whereby an operating element may be coupled therewith to actuate said plunger switch.

EVERARD LEROY JOHNSON.
HORACE WILLARD COMFORT.